(12) United States Patent
Zhou et al.

(10) Patent No.: US 8,494,998 B2
(45) Date of Patent: Jul. 23, 2013

(54) LINK SPAM DETECTION USING SMOOTH CLASSIFICATION FUNCTION

(75) Inventors: Dengyong Zhou, Redmond, WA (US); Christopher J. C. Burges, Bellevue, WA (US); Tao Tao, Bellevue, WA (US)

(73) Assignee: Microsoft Corporation, Redmond, WA (US)

(\*) Notice: Subject to any disclaimer, the term of this patent is extended or adjusted under 35 U.S.C. 154(b) by 123 days.

(21) Appl. No.: 13/078,129

(22) Filed: Apr. 1, 2011

(65) Prior Publication Data

US 2011/0282816 A1  Nov. 17, 2011

Related U.S. Application Data

(63) Continuation of application No. 11/901,072, filed on Sep. 14, 2007, now Pat. No. 7,941,391.

(60) Provisional application No. 60/927,647, filed on May 4, 2007.

(51) Int. Cl.
*G06F 17/00* (2006.01)
*G06N 5/02* (2006.01)

(52) U.S. Cl.
USPC .......................................................... 706/50

(58) Field of Classification Search
USPC .......................................................... 706/50
See application file for complete search history.

(56) References Cited

U.S. PATENT DOCUMENTS

| | | | |
|---|---|---|---|
| 6,990,485 B2 * | 1/2006 | Forman et al. | 707/737 |
| 7,010,526 B2 | 3/2006 | Denesuk et al. | |
| 7,788,254 B2 * | 8/2010 | Burges et al. | 707/710 |
| 7,941,391 B2 * | 5/2011 | Zhou et al. | 706/50 |
| 7,975,301 B2 * | 7/2011 | Chayes et al. | 726/23 |
| 2004/0059697 A1 * | 3/2004 | Forman | 706/46 |
| 2004/0148266 A1 * | 7/2004 | Forman | 706/46 |
| 2004/0260776 A1 | 12/2004 | Starbuck | |
| 2005/0060297 A1 * | 3/2005 | Najork | 707/3 |
| 2005/0262050 A1 * | 11/2005 | Fagin et al. | 707/3 |
| 2006/0004748 A1 * | 1/2006 | Ramarathnam et al. | 707/6 |
| 2006/0069667 A1 | 3/2006 | Manasse | |
| 2006/0095416 A1 | 5/2006 | Barkhin et al. | |
| 2006/0122957 A1 | 6/2006 | Chen | |
| 2006/0168056 A1 | 7/2006 | Gandhi et al. | |

(Continued)

FOREIGN PATENT DOCUMENTS

KR  0462292 B1  12/2004

OTHER PUBLICATIONS

Chan et al., J., "Co-training with a Single Natural Feature Set Applied to Email Classification", ACM International Conference on Web Intelligence, pp. 1-4, 2004.*

(Continued)

*Primary Examiner* — Michael B Holmes
(74) *Attorney, Agent, or Firm* — Westman, Champlin & Kelly, P.A.

(57) ABSTRACT

A spam detection system is disclosed. The system includes a classifier training component that receives a first set of training pages labeled as normal pages and a second set of training pages labeled as spam pages. The training component trains a web page classifier based on both the first set of training pages and the second set of training pages. A spam detector then receives unlabeled web pages uses the web page classifier to classify the unlabeled web pages as spam pages or normal pages.

14 Claims, 5 Drawing Sheets

U.S. PATENT DOCUMENTS

| | | | |
|---|---|---|---|
| 2006/0184500 A1* | 8/2006 | Najork et al. | 707/1 |
| 2006/0212142 A1* | 9/2006 | Madani et al. | 700/49 |
| 2007/0038600 A1 | 2/2007 | Guha | |
| 2007/0078699 A1* | 4/2007 | Scott et al. | 705/10 |
| 2007/0078939 A1 | 4/2007 | Kallen | |
| 2007/0239642 A1* | 10/2007 | Sindhwani et al. | 706/25 |

OTHER PUBLICATIONS

Drucker et al., H., "Support Vector Machines for Spam Categorization", pp. 1048-1054, IEEE Transaction on Neural Networks, vol. 10, No. 5, Sep. 1999.*

Zoltan Gyongyi et al. "Link Spam Detection Based on Mass Estimation," Oct. 31, 2005, Technical Report, pp. 1-21.

Andras A. Benczur et al., "SpamRank-Fully Automatic Link Spam Detection-Work in Progress," Support from NKFP-2/0017/2002 project Data Riddle and Various ETIK, OTKA and AKP grants.

Zoltan Gyongyi et al., "Combining Web Spam with TrustRank" Proceedings of the 30th VLDB Conference, Toronto, Canada, 2004, pp. 576-587.

Luca Bucchetti et al., "Link-Based Characterization and Detection of Web Spam," AIRWEB 06, Aug. 10, 2006, Seattle, WA USA 8 pgs.

Zhou et al., D., "Learning from Labeled and Unlabeled Data on a Directed Graph," International Conference on Machine Learning, pp. 1036-1043, 2005.

Zhou et al., D., "Semi-supervised Learning by Maximizing Smoothness," Journal of Machine Learning Research, pp. 1-23, 2004.

Zhou et al., D., "Learning from Labeled and Unlabeled Data using Random Walks," DAGM 2004, pp. 237-244, 2004.

Zhou et al., D., "A Regularization Framework for Learning from Graph Data," Workshop on Statistical Relational Learning of International Conference on Machine Learning, pp. 1-6, 2004.

International Search Report in related case PCT/US2008/061637, dated Aug. 26, 2008.

* cited by examiner

LINK SPAM DETECTION USING SMOOTH CLASSIFICATION FUNCTION

The present application is a continuation of and claims priority from U.S. patent application Ser. No. 11/901,072 filed on Sep. 14, 2007, which claims priority benefit to U.S. Provisional Application 60/927,647 filed on May 4, 2007.

BACKGROUND

Web search engines are currently in wide use, and are used to return a ranked list of web sites in response to a search query input by a user. It can be very valuable to have a web page returned high in the ranked list of web pages for a wide variety of different queries. This may increase the likelihood that a user will view a given web page.

Therefore, in order to increase web traffic to a given site, the authors of certain cites have tried to artificially manipulate the ranked list returned by search engines such that the web sites authored by those authors are ranked higher then they would normally be ranked. The particular manipulation techniques used by such authors depends on how a given web search engine ranks the pages for a given query. Any of the different manipulation techniques used by such authors are referred to as "spamming" techniques.

Some search engines use link analysis algorithms in order to generate the ranked list of web pages returned in response to a query. In general, link analysis algorithms identify an importance of a given web page, based upon the number of links that point to that web page. It is assumed that related web pages (those that have related content) have links to one another. Therefore, the more links that point to a web page, the more important the web page may be regarded by the search engine.

In order to manipulate this type of search engine, web spammers (those employing spamming techniques) sometimes attempt to create a large number of links to their web pages by having unrelated web pages (web page with unrelated content) linked to their web pages. This can be done using automated techniques to post links to their web sites onto other web pages, or simply by creating a large number of their own web pages and web sites, and then placing links in those web pages and web sites to all the other web pages and web sites which they created. This increases the number of links to any given web page or web site created by the author, regardless of whether it has related content. Similarly, some web sites reciprocally exchange links. When two unrelated web sites exchange links, at least one, and possibly both, of them are very likely to be spam (web sites that receive the benefit of spamming techniques).

It can be seen that spamming techniques can produce spam that misleads a search engine into returning low quality, or even entirely irrelevant, information to a user in response to a query. Therefore, a number of techniques have been developed in order to identify spam so that it can be removed from the ranked search results returned by a search engine. For instance, human experts can generally identify web spam in a very effective manner. However, it is quite easy for a spammer to create a large number of spam pages and to manipulate their link structure. It is thus impractical to detect web spam using only human judges. Therefore, some automatic approaches have been developed to identifying spam. One category of such approaches is referred to as a supervised approach in which some known examples of spam are provided to the system, and the system learns to recognize spam from those examples.

One such technique builds a ranking measure for web pages modeled on a user randomly following hyperlinks through the web pages. This ranking measure is well known as PageRank used by the Google search engine. At each web page, the modeled user either selects an outlink uniformly at random to follow with a certain probability, or jumps to a new web page selected from the whole web uniformly at random with the remaining probability. The stationary probability of a web page in this "random walk" is regarded as the ranking score of the web page. The basic assumption behind such a technique is that a hyperlink from one page to another is a recommendation of the second page by the author of the first page. If this assumption is recursively applied, then a web page is considered to be important if many important web pages point to it.

By using random jumps to uniformly selected pages, this system accommodates the problem that some high quality pages have no out links, although they are pointed to by many other web pages.

This concept of random jumps has also been adopted, in another way, to address the problem of web spam. Basically, the random user described above is allowed to jump to a set of pages (seed pages) which have been judged as being high quality, normal pages, by human experts. Assuming this choice for the random jumps, the stationary probability of a web page is regarded as its trust score, and a web page with a trust score smaller than a given threshold value is considered to be spam.

This type of system can also be understood as follows: initially, only the selected good seed pages have trust scores equal to one, and the trust scores of other web pages are zero. Each seed page then iteratively propagates its trust score to its neighbors, and its neighbors further propagate their received scores to their neighbors. The underlying assumption in this algorithm is that web pages of high quality seldom point to spam pages.

A counterpart to this algorithm allows the random web user to either select an inlink uniformly at random to follow, in reverse, with a certain probability, or jump to a new web page randomly selected from a web page set which has been judged as spam by human experts with the remaining probability. The stationary probability of a web page is, in this system, referred to as its antitrust rank, or antitrust score. A web page will be classified as spam if its score is larger than a chosen threshold value. In terms of the propagation understanding, the scores in this system are propagated in the reverse direction along the inlinks. The basic underlying assumption of this type of system is that a web page pointing to spam pages is likely to be spam, itself.

Another system is referred to as a functional ranking system. It considers a general ranking function that depends on incoming paths of various lengths weighted by some chosen damping function that decreases with distance. In other words, links from pages that are a greater distance from the subject web page are weighted by weight that is damped less than links from closer web pages. That is, spam pages may gain an artificially high score under a system that simply ranks the pages based on the number of links to it, because a spam page may be formed by using a spamming technique to have many incoming links from its immediate neighbor pages. However, spam pages of this type can be demoted using this system by choosing a damping function that ignores the direct contribution of links from pages directly adjacent the given page, and only valuing links that start at least one link away from the subject page.

Yet another technology to be considered is general machine learning technology. In this technology, features must be selected that are useful in detecting spam, and each web page is then represented as a vector having each element described by one type of spam feature. The features can be the number of inlinks, the number of outlinks, scores under any of the above-mentioned algorithms, etc. Then, a classifier is chosen, such as a neural network, a decision tree, a support vector machine (SVM), etc., and it is trained with a set of examples of normal and spam web pages which have been judged by human experts. The trained classifier is then used to predict a given web page as spam or not spam (i.e., as spam or a content page). One difficulty with this methodology is that the efficiency of a spam feature is generally validated only on the web pages which are not sampled from the entire web uniformly at random, but instead from large websites and highly ranked web pages. Consequently, the trained classifier is biased to those selected pages, and it does not generalize well to the entire web.

The discussion above is merely provided for general background information and is not intended to be used as an aid in determining the scope of the claimed subject matter.

SUMMARY

Embodiments of a spam detection system are disclosed. In one embodiment, the system includes a classifier training component that receives a first set of training pages labeled as normal pages and a second set of training pages labeled as spam pages. The training component trains a web page classifier based on both the first set of training pages and the second set of training pages. A spam detector then receives unlabeled web pages uses the web page classifier to classify the unlabeled web pages as spam pages or normal pages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
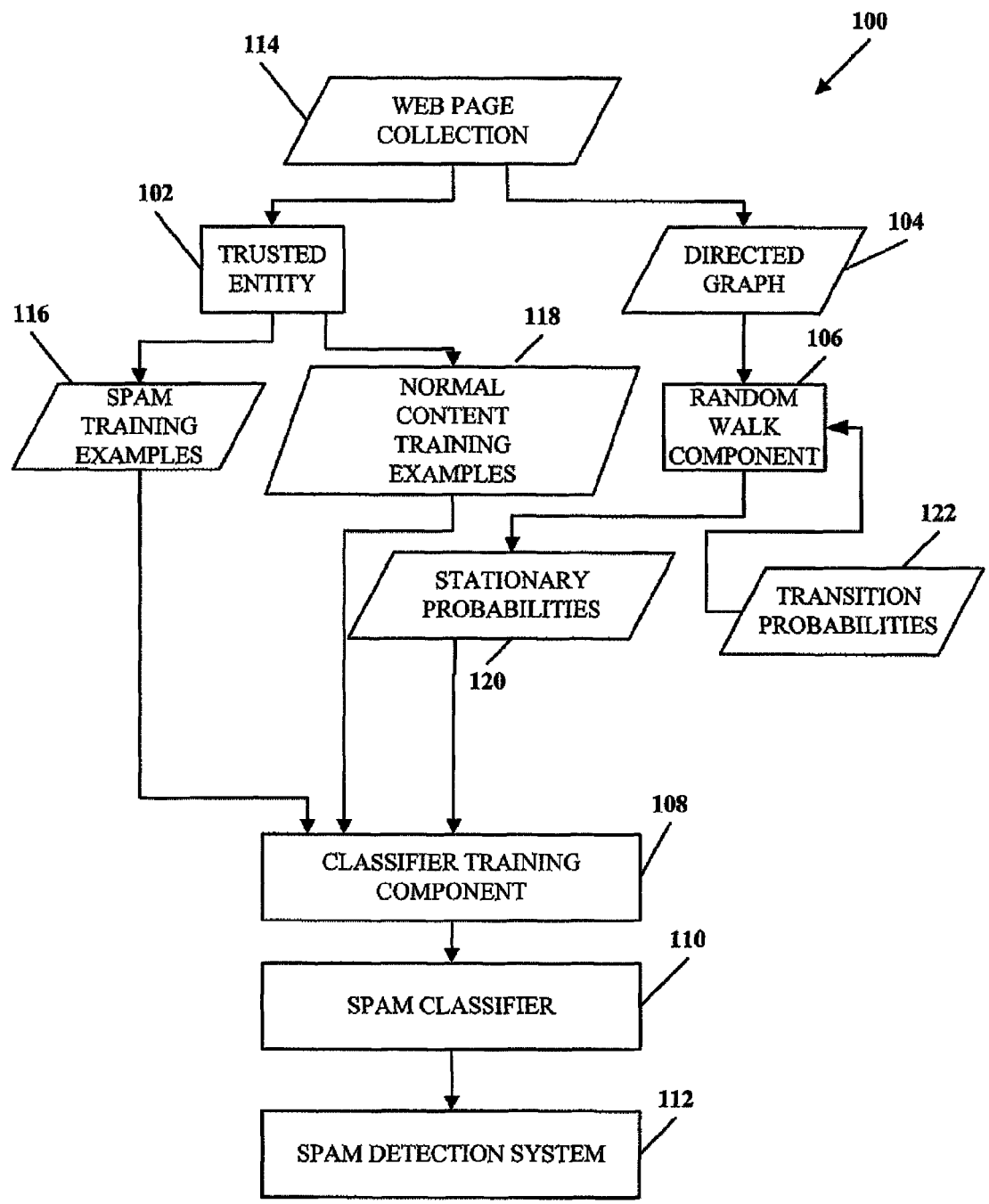
FIG. 1 is a block diagram of one illustrative embodiment of a link spam detection system.

Link spam detection in the present specification is discussed in terms of a machine learning problem of classification on directed graphs. FIG. 1 is a block diagram of one illustrative embodiment of a link spam detection system 100. System 100 shows trusted entity 102, directed graph 104, random walk component 106, classifier training component 108, spam classifier 110, and spam detection system 112.

In system 100, a collection of web pages 114 is also shown. The collection of web pages 114 is considered a directed graph, in that the web pages themselves in collection 114 are nodes in the graph while hyperlinks between those web pages are directed edges in the directed graph. Of course, it will be appreciated that the present system can be applied at the domain/host level as well, where the domains/hosts are nodes in the graph and hyperlinks among the web pages in the domains/hosts are the directed edges. For purposes of the present discussion, however, and by way of example only, reference will be made to the web pages in collection 113 as the nodes and hyperlinks between those pages as the directed edges.

Figure 2:
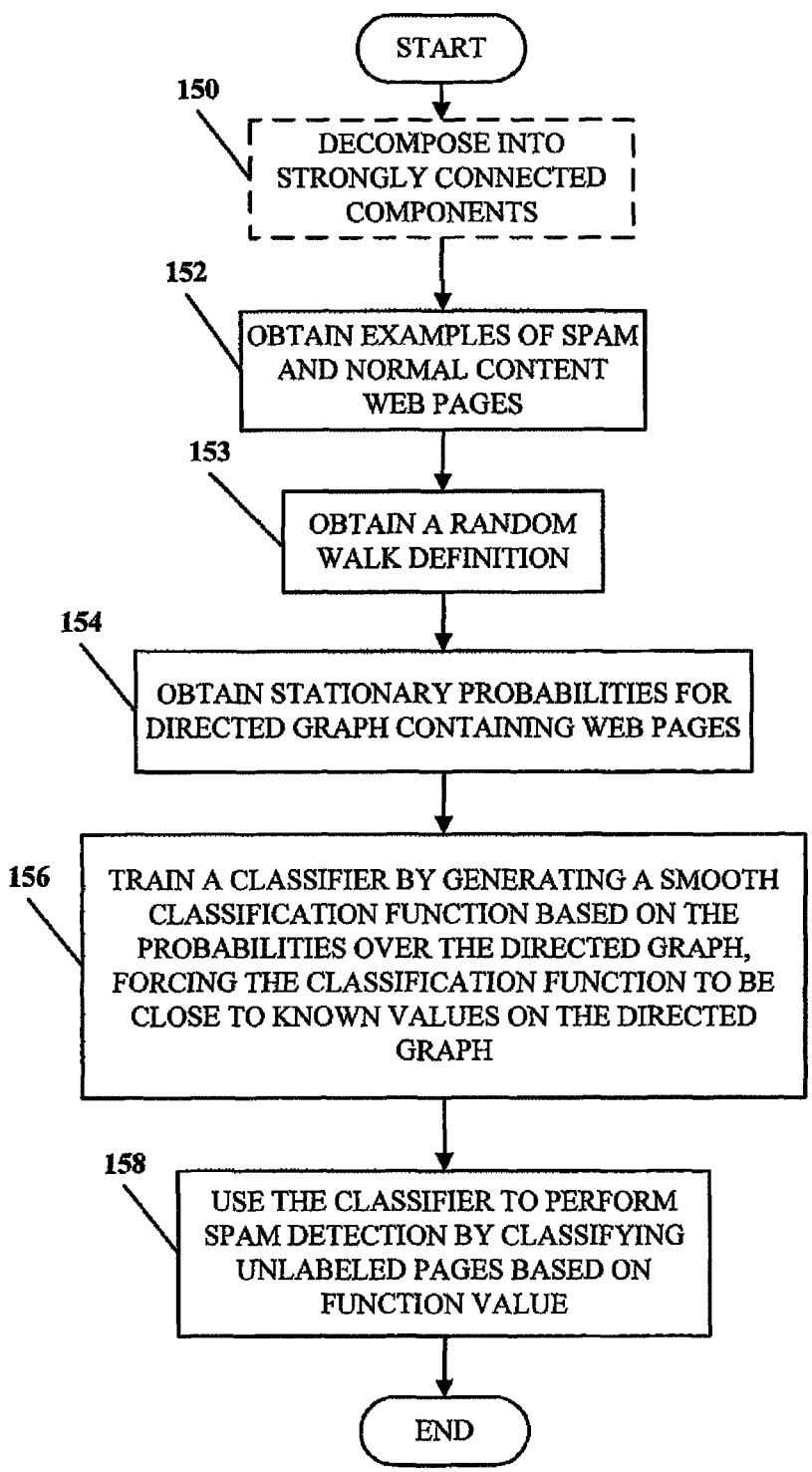
FIG. 2 is a flow diagram illustrating one embodiment of the overall operation of the system shown in FIG. 1.

FIG. 2 is a flow diagram illustrating one illustrative embodiment of the operation of system 100 shown in FIG. 1. FIGS. 1 and 2 will now be described in conjunction with one another.

It will first be noted that, if web page collection 114 does not form a strongly connected graph, then it is first decomposed into strongly connected components, and the present process proceeds with respect to each of the strongly directed components. The precise definition of what makes a strongly connected graph, or strongly connected component, is set out below. Briefly, however, a graph can be considered strongly connected if each vertex (or node) in the graph is connected to every other vertex (or node) in the graph by some path of directed edges. Decomposing the directed graph into strongly connected components is illustrated by block 150 in FIG. 2 and is shown in phantom indicating that it is only performed, if necessary.

The web page collection 114 is also provided to trusted entity 102, such as a human expert, in identifying link spam. Trusted entity 102 then identifies some examples of spam web pages in web page collection 114 as spam training examples 116. Trusted entity 102 also identifies good web pages (or normal web pages) in web page collection 114 as normal training examples 118. Obtaining these examples is indicated by block 152 in FIG. 2.

Random walk component 106 then receives a definition of a random walk on directed graph 104 (or each strongly connected component in directed graph 104), the random walk being defined by translation probabilities (set out below in Eqs. 20-22). Receiving this definition is indicated by block 153 in FIG. 1. Based on the defined random walk, component 106 obtains stationary probabilities associated with each node in directed graph 104. The stationary probabilities are indicated by block 120 in FIG. 1. Obtaining these probabilities for directed graph 104 is indicated by block 154 in FIG. 2, and the stationary probabilities are obtained by conducting the defined random walk through the directed graph 104. This is discussed in greater detail below with respect to FIG. 3.

In any case, once examples 116 and 118 and probabilities 120 and 122 are obtained, classifier training component 108 trains a classifier that can be used in link spam detection. The classifier is shown in FIG. 1 as spam classifier 110. In one embodiment, training a classifier is performed by generating a smooth classification function based on the probabilities 120 and 122 over the detected graph 104. In generating the classification function, the values of the classification function are forced to be close to known values for examples 116 and 118. In other words, the values of the classification function are forced to be close to the values that indicate spam and normal pages at the nodes in the graph that are actually known to be spam and normal pages as identified by the trusted entity 102. For example, assume that the value of −1 indicates that the node is spam, while the value of 1 indicates that the node is a normal content page. Then, the classification function is forced to be at least close to the values of 1 or −1 at the pages known to be normal pages and spam pages, respectively. This is indicated by block 156 in FIG. 2.

The closeness between the classification function and the known values can be measured in a variety of different ways. For example, the closeness can be measured using least square loss, hinge loss, precision/recall measure, the F1-score, the ROC score, or the AUC score, as examples.

In accordance with one embodiment, the classification function is not only close to known values at known nodes, but it is relatively smooth in that it changes relatively slowly on densely connected subgraphs. In other words, the nodes that reside close to one another on the subgraph may likely have values which are relatively close to one another. However, if they are known to be one spam node and one normal node, respectively, then the classification function changes by a large amount between those nodes, but this lack of smoothness is penalized in the chosen cost function that is optimized.

This can provide significant advantages over prior systems. In prior systems, for instance, those pages closely related to spam pages were deemed as spam while all other pages were deemed as normal pages. In another prior system, those pages close to normal pages were deemed normal pages, while all other pages were deemed spam. The present system includes information related to both normal pages and spam pages in classifying a given page under consideration as content or spam. Also, because pages that are relatively close to one another on the directed graph are assumed to be the same type (pages close to a known spam page are likely to be spam pages, while pages close to a known normal page are likely to be normal pages) by making the function smooth and relatively slow changing pages in the directed subgraph that are close to a known normal content page will have classification function values that more likely indicate it to be a normal content page. Similarly, those pages in the directed subgraph that are close to a spam page will have classification function values that are likely to indicate that it will be a spam page. The classification function value can change abruptly, if necessary. Again, however, this is penalized.

In any case, the spam classifier is then used to assign values to all unlabeled nodes in the directed graph 104. A threshold can be set, and those pages that meet the classification threshold may be deemed to be normal pages, while those nodes having a value that does not meet the threshold value may be deemed to be spam pages. In one embodiment, simply the sign of the value calculated using the classification function is used to determine whether the associated node is spam or content. This effectively sets the classification function threshold value at 0. It may, however, be desirable to set the value at a level other than 0. For instance, if it is more desirable in a given application to error on the side of classifying spam pages as normal pages, then the threshold may be set below 0. On the other hand, if a given application deems it more desirable to error on the side of classifying normal pages as spam pages, then the threshold value can be set above 0, etc. Using the classification function embodied in spam classifier 110 to perform spam detection is indicated by block 158 in FIG. 2.

Figure 3:
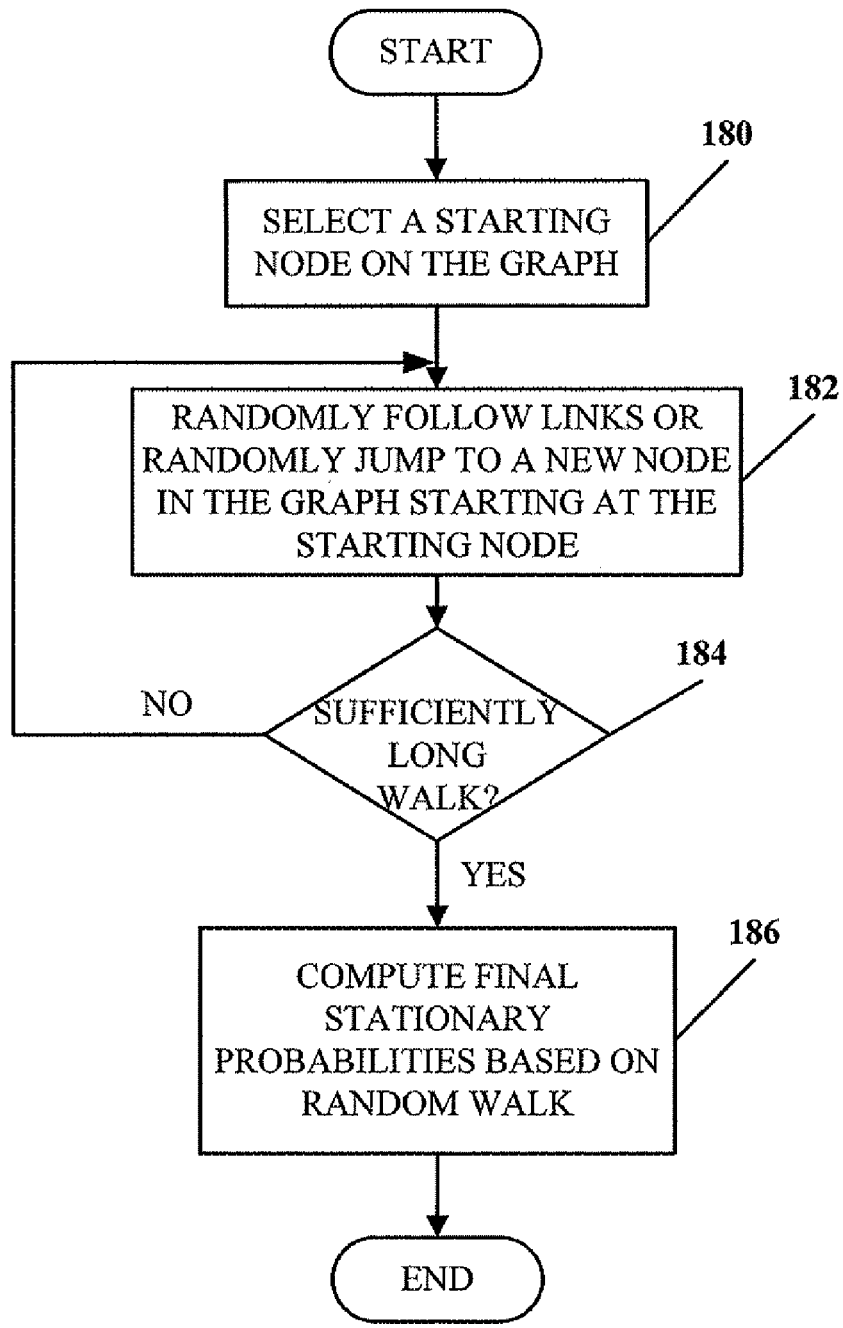
FIG. 3 is a flow diagram illustrating one embodiment of obtaining stationary and transition probabilities for a directed graph.

FIG. 3 is a flow diagram showing one illustrative embodiment of random walk component 106 in obtaining the stationary probabilities 120. In one embodiment, random walk component 106 simply selects, at random, a starting node in directed graph 104. This is indicated by block 180 in FIG. 3. Component 106 then randomly follows links in graph 104 starting at the selected starting node. This is indicated by block 182. It will be noted that, at each step, component 106 can follow inlinks or outlinks from the given web page uniformly at random. If the outlinks are followed, component 106 simply follows links from the current page to another page to which it is linked through an outlink. However, if inlinks are used, then component 106 travels backward along the links that link to the current page, to the page at which the inlink originates. For the present description, following the outlink will be used, although either inlinks or outlinks could be used, as desired.

Component 106 continues to follow the links, uniformly at random, for a sufficient amount of time. This is indicated by block 184. The amount of time will depend upon the size of the collection of web pages 114. As component 106 is performing this random walk, it calculates the stationary probability distribution for the various nodes in graph 104. The "transition probabilities" are the probabilities of transitioning from any given node on graph 104 to another node. The "stationary probability distribution" assumes that component 106 starts from a randomly chosen node in graph 104, and jumps to an adjacent node by choosing an outlink. Assume for the sake of example that this is repeated infinitely many times for the various nodes in graph 104. Then, if graph 104 is connected (that is, using such a random walk, any point can be reached from any other point), then the fraction of time component 106 spends at a given node converges to a fixed number (where the corresponding numbers for all nodes sum to 1), and that fixed number is actually independent of the choice of starting nodes. In other words, the stationary probability distributions are the probabilities of being in any given node on directed graph 104.

Component 106 can use any given metric to determine whether it has performed the random walk sufficiently long enough. For example, where the stationary probabilities do not change by a given amount (that is they are changing very little or very slowly with each given iteration of the jump) then, component 106 may deem that it has performed the random walk long enough. In any case, once the random walk has been performed for sufficiently long time, component 106 calculates the final stationary probabilities 120 that are output to classifier training component 108. This is indicated by block 186 in FIG. 3.

It may seem at first that performing the classification over a large directed graph may take an inordinately large amount of time. It has been found that it can be done quite quickly, using a relatively small number of training examples. For instance, in a directed graph having 20 million web pages connected by directed edges (links) with 10,000 examples of spam web pages and 20,000 examples of content web pages, the classification can be performed in several minutes.

Having thus described transductive detection of spam pages in an intuitive sense, it will now be described in a more formal way. First, a discussion of some specific items of notation will be made.

Let G=(V,E) denote a directed graph, where V is the set of vertices, and E the set of edges. For a given edge e∈E; denote the initial vertex of e by $e^-$, and the terminal vertex of e by e+. Also denote by (u, v) an edge from the vertex u to the vertex v. It is clear that an undirected graph can be regarded as a directed graph with each edge being double oriented. A graph G is weighted if it is associated with a function w: $E \rightarrow R^+$ which assigns a positive number w(e) to each edge e of G: Let G=(V,E,w) denote a weighted directed graph. The function w is called the weight function of G: The in-degree $d^-$ and the out-degree $d^+$ of a vertex $v \in V$ are respectively defined as:

$$d^-(v) = \sum_{\{e|e^+=v\}} w(e), \text{ and } d^+(v) = \sum_{\{e|e^-=v\}} w(e) \quad \text{Eq. 1}$$

A path is a tuple of vertices $(v_1, v_2, \ldots, v_p)$ with the property that $(v_i, v_{i+1}) \in E$ for $1 \leq i \leq p-1$. A directed graph is strongly connected when for every pair of vertices u and v there is a path in which $v1=u$ and $v_p=v$. For a strongly connected graph, there is an integer $k \geq 1$ and a unique partition $V = V_0 \cup V_1 \cup \ldots \cup V_{k-1}$ such that for all $0 \leq r \leq k-1$ each edge $(u, v) \in E$ with $u \in V_r$ has $v \in V_{r+1}$, where $V_k = V_0$; and k is maximal, that is, there is no other such partition $V = V_0' \cup \ldots \cup V_{k'-1}'$ with $k' > k$.

When $k=1$, the graph is aperiodic; otherwise the graph is periodic.

For a given weighted directed graph, there is a natural random walk on the graph with the transition probability function $p: V \times V \rightarrow \mathbb{R}^+$ defined by:

$$p(u, v) = \frac{w(u, v)}{d^+(u)} \quad \text{Eq. 2}$$

for all $(u, v) \in E$, and 0 otherwise. If the graph is strongly connected, there is a unique function $\pi: V \rightarrow \mathbb{R}^+$ which satisfies:

$$\sum_{u \in V} \pi(u) p(u, v) = \pi(v), \text{ and } \sum_v \pi(v) = 1 \quad \text{Eq. 3}$$

Figure 4:
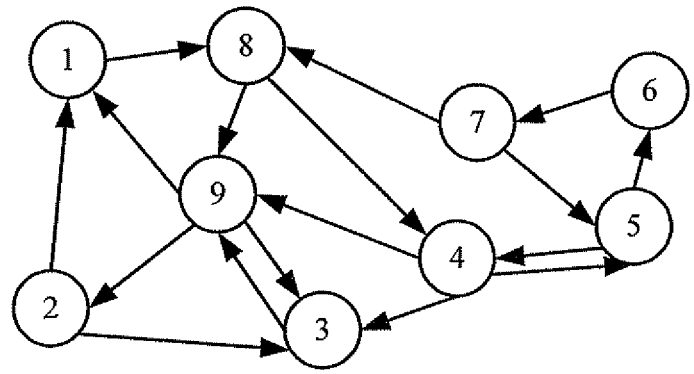
FIG. 4 is one embodiment of a strongly connected directed web graph.

The first equation in Equation 3 is called the balance equation, and $\pi$ is called the Perron vector. For a general directed graph, there is no closed form solution for $\pi$. If the graph is both strongly connected and aperiodic, the random walk defined by Eq. 2 converges to the Perron vector $\pi$. Unless stated otherwise, the directed graphs considered are always assumed to be strongly connected. One embodiment of a strongly connected graph is shown in FIG. 4. The nodes (or vertices) are labeled 1-9 while the edges are shown as arrows.

Now, a number of discrete operators on directed graphs are defined. The operators are discrete analogs of the corresponding differential operators on Riemannian manifolds. As discussed below, the discrete operators are then used to develop a discrete analog of classical regularization theory. Consequently, as in other regularization based machine learning algorithms in vectorial spaces (for instance, support vector machines (SVMs)) the present classification algorithm for directed graphs is derived from the discrete regularization.

In any case, let F(V) denote the set of all real-valued functions on V; and F(E) the set of all real-valued functions on E. The function set $F(V\mu)$ can be regarded as a Hilbert space $H(V\mu)$ with the inner product defined by:

$$\langle \varphi, \phi \rangle_{H(V)} = \sum_{v \in V} \varphi(v) \phi(v) \pi(v) \quad \text{Eq. 4}$$

where $\phi, \phi \in F(V)$. Let $c(e) = \pi(e^-) p(e)$. The number $c(e)$ is called the ergodic flow on e. It is easy to check that the ergodic flow is a circulation, that is:

$$\sum_{\{e|e^-=v\}} c(e) = \sum_{\{e|e^+=v\}} c(e), \forall v \in V \quad \text{Eq. 5}$$

A Hilbert space H(E) over F(E) can be constructed with the inner product defined by:

$$\langle \vartheta, \psi \rangle_{H(E)} = \sum_{e \in E} \vartheta(e) \psi(e) c(e) \quad \text{Eq. 6}$$

Where $\sigma, \psi \in F(E)$.

The discrete gradient $\nabla: H(V) \rightarrow H(E)$ is defined as an operator:

$$(\nabla \phi)(e) := \phi(e^+) - \phi(e^-), \forall \phi \in H(V) \quad \text{Eq. 7}$$

For simplicity, $(\nabla \phi)(e)$ is also denoted as $\nabla_e \phi$. For gaining an intuition of this definition, one may imagine a set of buckets, and some of them are connected by tubes. Assume a tube e which connects buckets $e^-$ and $e^+$, and the quantities of fluid in buckets $e^-$ and $e^+$ to be $\phi(e^-)$ and $\phi(e^+)$. Then the flow through the tube should be proportional to the pressure difference and hence to $\phi(e^+) - \phi(e^-)$. When the fluid distributes itself uniformly among buckets, that is, $\phi$ is constant, the pressure differences will disappear and consequently there will be no flow in tubes any more, that is, $\nabla \phi$ vanishes everywhere.

As in the continuous case, the discrete divergence div: $H(E) \rightarrow H(V)$ can be defined as the dual of $-\nabla$ that is:

$$\langle \nabla \phi, \psi \rangle_{H(E)} = \langle \phi, -\text{div } \psi \rangle_{H(V)} \quad \text{Eq. 8}$$

where $\phi \in H(V), \psi \in H(E)$. By a straightforward computation, the following is obtained:

$$(\text{div} \psi)(v) = \frac{1}{\pi(v)} \left( \sum_{\{e|e^-=v\}} c(e) \psi(e) - \sum_{\{e|e^+=v\}} c(e) \psi(e) \right) \quad \text{Eq. 9}$$

By following the above fluid model, the divergence measures the net flows at buckets. Now the concept of circulation can be generalized in terms of divergence. A function $\psi \in H(E)$ is called a circulation if and only if div $\psi = 0$.

The discrete Laplacian $\Delta: H(V) \rightarrow H(V)$ is defined by:

$$\Delta := -\frac{1}{2} \text{div} \circ \nabla \quad \text{Eq. 10}$$

Compared with its counterpart in the continuous case, the additional factor in Eq. 10 is due to edges being oriented. From Eq. 10:

$$\langle \Delta \varphi, \phi \rangle_{H(V)} = \frac{1}{2} \langle \nabla \varphi, \nabla \phi \rangle_{H(E)} = \langle \varphi, \Delta \phi \rangle_{H(V)} \quad \text{Eq. 11}$$

Note that the first equation in Eq. 11 is a discrete analog of Green's formula. In addition, Eq. 11 implies that $\Delta$ is self-adjoint. In particular, when $\phi=\varphi$, then:

$$\langle \Delta \varphi, \varphi \rangle_{H(V)} = \frac{1}{2} \langle \nabla \varphi, \nabla \varphi \rangle_{H(E)} = \frac{1}{2} \|\nabla \varphi\|^2_{H(E)} \qquad \text{Eq. 12}$$

which implies that $\Delta$ is positive semi-definite. By substituting Eqs. 7 and 9 into Eq. 10:

$$(\Delta \varphi)(v) = \varphi(v) - \frac{1}{2\pi(v)} \qquad \text{Eq. 13}$$

$$\left( \sum_{\{e|e^+=v\}} c(e)\varphi(e^-) + \sum_{\{e|e^-=v\}} c(e)\varphi(e^+) \right)$$

when the graph is undirected, that is, each edge being double oriented, Eq. 13 reduces to:

$$(\Delta \varphi)(v) = \varphi(v) - \frac{1}{d(v)} \sum_{u \sim v} w(u, v)\varphi(v) \qquad \text{Eq. 14}$$

Eq. 14 has been widely used to define the Laplacian for an undirected graph. Now, define a family of functions $\{\delta_v\}_{v \in V}$ with $\delta_v(u) = I_{u=v}$, which is clearly a basis of H(V). The matrix form of $\Delta$ with respect to this basis has the following components:

$$\Delta_{am}(u, v) = \begin{cases} -\frac{c(u,v) + c(v,u)}{2\pi(u)} & u \neq v, \\ 1 & u = v \end{cases} \qquad \text{Eq. 15}$$

This matrix is not symmetric. However, if another basis $\{\pi^{-1/2}(v)\delta_v\}_{v \in V}$ is chosen, then $\Delta$ can be represented as a symmetric matrix:

$$\Delta_{sm}(u, v) = \begin{cases} -\frac{c(u,v) + c(v,u)}{2\sqrt{\pi(u)\pi(v)}} & u \neq v, \\ 1 & u = v \end{cases} \qquad \text{Eq. 16}$$

This matrix has been used to define Laplacian for directed graphs.

Figure 5:
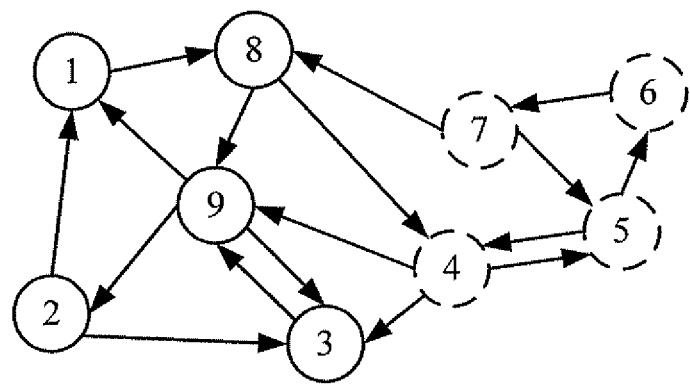
FIG. 5 illustrates one embodiment of the web graph shown in FIG. 4 after classification.

Now, learning on directed graphs using the above analysis is discussed. Given a directed graph G=(V,E,w), and a discrete label set L={-1,1}, the vertices in a subset $S \subset V$ have labels in L. The task is to predict the labels of those unclassified vertices in $S^C$, the complement of S. The present link spam detection problem can be cast into classification on a directed graph. For instance, FIG. 5 shows the vertices (or nodes) in the graph shown in FIG. 4 classified as spam or normal pages. The solid nodes are classified as normal pages while those shown in phantom are spam pages.

Define a function y with y(v)=1 or -1 if v∈S, and 0 if v∈$S^C$. For classifying those unclassified vertices in $S^C$, define a discrete regularization:

$$\underset{\varphi \in H(V)}{\operatorname{argmin}} \{\|\nabla \varphi\|^2_{H(E)} + C\|\varphi - y\|^2_{H(V)}\} \qquad \text{Eq. 17}$$

where C>0 is the regularization parameter. In the objective function, the first term forces the classification function to be relatively smooth, and perhaps as smooth as possible and the second term forces the classification function to fit the given labels as well as possible.

When choosing the basis $\{\delta_v\}_{v \in V}$, Eq. 17 can be written as:

$$\underset{\varphi \in H(V)}{\operatorname{argmin}} \left\{ \sum_{e \in E} \pi(e^-)p(e)(\varphi(e^+) - \varphi(e^-))^2 + C \sum_{v \in V} \pi(v)(\varphi(v) - y(v))^2 \right\} \qquad \text{Eq. 18}$$

Again, the first term makes the function relatively smooth over all nodes while the second term forces the function to fit the labeled nodes to a desired closeness. If each function in H(V) is scaled with a factor $\pi^{-1/2}$ (in other words, choose another basis $\{\pi^{-1/2}(v)\delta_v\}_{v \in V}$), then Eq. 18 will be transformed into:

$$\underset{\phi \in H(V)}{\operatorname{argmin}} \left\{ \sum_{e \in E} \pi(e^-)p(e) \left( \frac{\varphi(e^+)}{\sqrt{\pi(e^+)}} - \frac{\varphi(e^-)}{\sqrt{\pi(e^-)}} \right)^2 + C \sum_{v \in V} (\varphi(v) - y(v))^2 \right\} \qquad \text{Eq. 19}$$

However, it can be seen that Eq. 18 is much more natural than Eq. 19.

A random walk over a given directed graph can be defined in many different ways. Three exemplary types of random walk used in spam detection are:

1. Following outlinks uniformly at random.
Formally, define a random walk with:

$$p(u, v) = \frac{w(u, v)}{d^+(u)} \qquad \text{Eq. 20}$$

This is the one discussed above with respect to FIG. 3.

2. Following links uniformly at random regardless of directionality. Formally, define a random walk with:

$$p(u, v) = \frac{w(u, v) + w(v, u)}{d^+(u) + d^-(u)} \qquad \text{Eq. 21}$$

3. Following inlinks uniformly at random.
Formally, define a random walk with:

$$p(u, v) = \frac{w(v, u)}{d^-(u)} \qquad \text{Eq. 22}$$

Other choices of random walks can be used as well.

Assigning values to the nodes in directed graph 104 basically requires selection of a random walk definition (transition probabilities) and solving Eq. 18 above for each of the nodes. This is set out above with respect to FIG. 2. Solving for Eq. 18 is set out more formally in pseudocode in Table 1 below for the random walk that inversely follows the links. To solve the optimization problem in Eq. 18, differentiate the objective function with respect to φ and then obtain:

$$\Delta_{am}\phi+C(\phi-y)=0 \qquad \text{Eq. 23}$$

where the first term on the left hand side is derived from Eq. 11 via the differential rule on inner products. The above equation can be written as:

$$(CI+\Delta_{am})\phi=Cy \qquad \text{Eq. 24}$$

where I is the identity matrix. This linear system has the closed-form solution:

$$\phi=C(CI+\Delta_{am})^{-1}y \qquad \text{Eq. 25}$$

although it may be more efficient to solve the linear system directly, rather than computing the inverse.

In the algorithm in Table 1 below, a parameter $\alpha\in]0,1[$ is used instead of $C\in]0,\infty[$. The relationship between α and C can be expressed as:

$$\alpha = \frac{1}{1+C} \qquad \text{Eq. 26}$$

In the last step in Table 1, the classification is based on the sign of the function value on each vertex. As mentioned above with respect to FIG. 2, this is equivalent to setting the classification threshold to 0.

TABLE 1

TRANSDUCTIVE LINK SPAM DETECTION

Given a web graph G = (V, E), some web pages S ⊂ V have been manually labeled as content or spam. The graph is strongly connected. Otherwise, it is decomposed into strongly connected components. The remaining unclassified webpages in V may be classified as follows:
1. Define a random walk which chooses an inlink uniformly at random to follow. Formally, this random walk has the transition probabilities:

$$p(u, v) = \frac{w(v, u)}{d^-(u)},$$

for any u, v in V. Let π denote the vector which satisfies:

$$\sum_{u\in V} \pi(u)p(u, v) = \pi(v).$$

2. Denote by P the matrix with the elements p(u, v), and Π the diagonal matrix with the diagonal elements being stationary probabilities π(u) and zeros everywhere else. Form the matrix:

$$L = \Pi - \alpha\frac{\Pi P + P^T\Pi}{2}$$

where α is a parameter in ]0, 1[.
3. Define a function y on V with y(v) = 1 or −1 if the web page v is labeled as content or spam, and 0 if v is unlabeled. Solve the linear system:
Lφ = Πy,
and classify each unlabeled web page v as sign φ(v).

Figure 6:
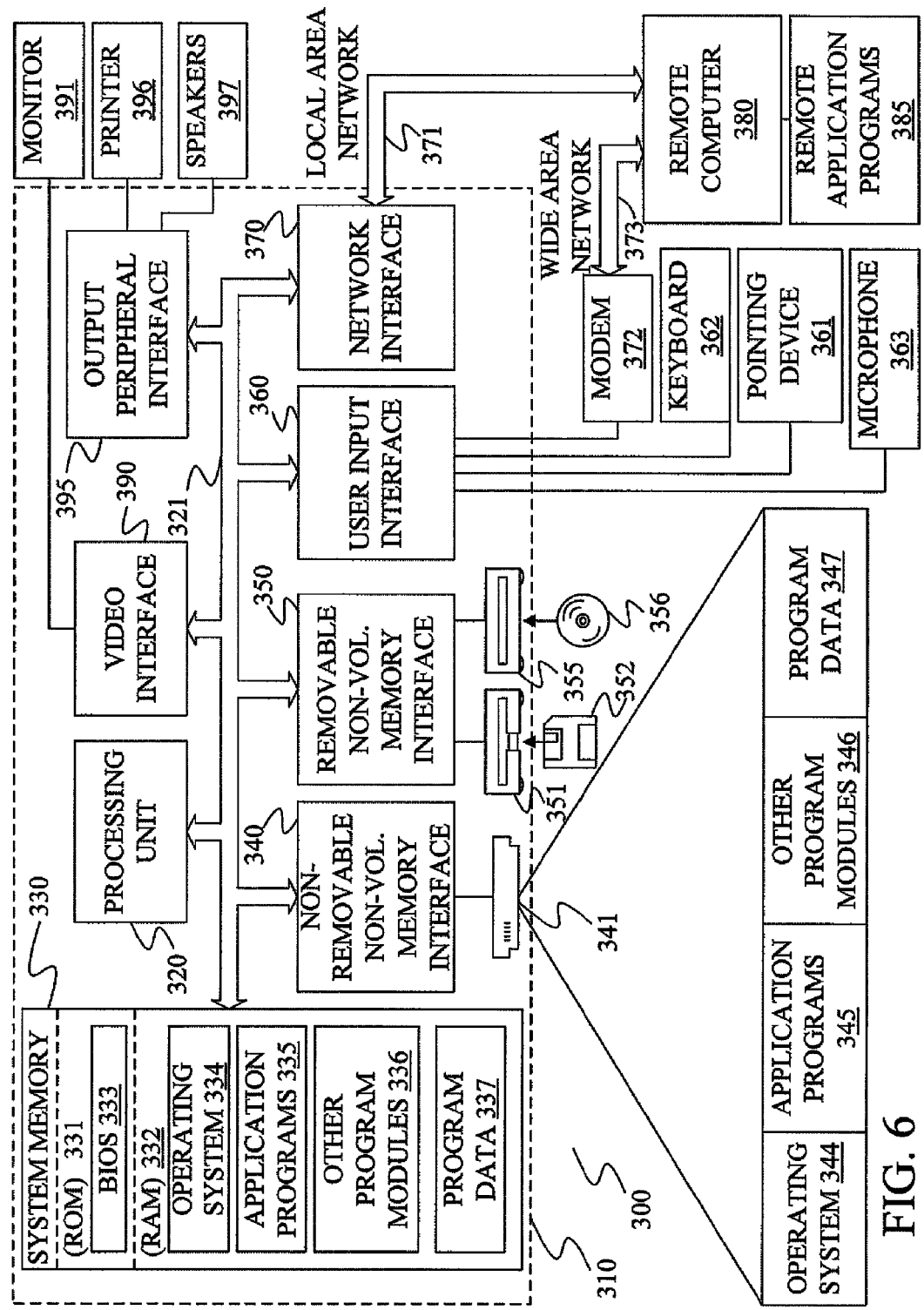
FIG. 6 is a block diagram of one embodiment of an illustrative computing environment.

FIG. 6 illustrates an example of a suitable computing system environment 300 on which embodiments may be implemented. The computing system environment 300 is only one example of a suitable computing environment and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 6, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 6 illustrates operating system 334, application programs 335, other program modules 336, and program data 337. Any part of system 100 can be in programs 335, modules 336, or anywhere else, as desired.

The computer 310 may also include other removable/non-removable volatile/nonvolatile computer storage media. By way of example only, FIG. 6 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 6, provide storage of computer readable instructions, data structures, program modules and other data for the computer 310. In FIG. 6, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 6 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 6 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of detecting spam in a collection of web pages, the method comprising:
receiving a first subset of the collection of web pages marked by a trusted entity as spam;
receiving a second subset of the collection of web pages marked by the trusted entity as content;
identifying a classifier function by encouraging, with a cost function penalty, the web pages in the first subset to take a value close to a spam value and the web pages in the second subset to take a value close to a content value, and penalizing, with the cost function, differences in function values over nodes in the collection of web pages;
utilizing a computer processor to classify a set of unlabeled web pages as spam or content based on the classifier function values assigned; and
outputting an indication of the classification of the unlabeled web pages as spam or content for use by a user.

2. The method claim 1, wherein identifying the classifier function includes performing a random walk over the web pages by:
choosing a starting point in a directed graph having nodes representing the web pages in the collection and edges representing links among the nodes; and
repeatedly moving to a new node in the directed graph by selecting uniformly, at random, whether to follow a link from a current node to another node in the directed graph or to randomly jump to another node in the directed graph.

3. The method of claim 2, wherein assigning the classifier function comprises:
computing stationary probabilities and transition probabilities based on how often a link and node are selected.

4. The method of claim 3, wherein selecting whether to follow a link is done according to a predefined random walk definition.

5. The method of claim 4, wherein the predefined random walk definition comprises:
one of following outlinks from the current node, inlinks to the current node, and inlinks or outlinks regardless of direction relative to the current node.

6. The method of claim 2 and further comprising:
breaking the directed graph into strongly connected components, such that each node in any given strongly connected component has at least one path, through links in the given strongly connected component, to every other node in the given strongly connected component.

7. A computer-implemented method of detecting spam in a collection of web pages, the method comprising:
receiving a first subset of the collection of web pages identified as spam;
receiving a second subset of the collection of web pages identified as non-spam content;
identifying a classifier function based on values assigned to web pages in the first and second sebsets;
utilizing a computer processor to classify a set of non-classified web pages as spam or non-spam content based on the classifier function; and
outputting an indication of the classification of the non-classified web pages as spam or content for use by a user.

8. The method of claim 7, wherein identifying the classifier function comprises identifying the classifier function based on application of a cost function penalty to pages in the collection web pages.

9. The method of claim 7, wherein identifying the classifier function comprises identifying the classifier function based on application of a function penalty to the web pages in the first subset such that the web pages in the first subset take on a value close to a spam value.

10. The method of claim 9, wherein identifying the classifier function comprises identifying the classifier function based on application of a function penalty to the web pages in the second subset such that the web pages in the first subset take on a value close to a non-spam content value.

11. The method of claim 7, wherein identifying the classifier function comprises identifying the classifier function based on application of a function penalty to the web pages in the second subset such that the web pages in the first subset take on a value close to a non-spam content value.

12. The method of claim 7, wherein identifying the classifier comprises identifying based on a random walk over the web pages in said collection.

13. The method of claim 12, wherein the random walk is accomplished by a series of steps, comprising:
choosing a starting point in a directed graph having nodes representing the web pages in the collection and edges representing links among the nodes; and
repeatedly moving to a new node in the directed graph by selecting whether to follow a link from a current node to another node in the directed graph or to jump to another node in the directed graph.

14. The method of claim 7, wherein assigning the classifier function comprises computing stationary probabilities and transition probabilities.

* * * * *